May 19, 1959 K. M. HOLLAND 2,887,425
METHOD OF MAKING RUBBER HONEYCOMB PRODUCT
Filed March 26, 1954 2 Sheets-Sheet 1
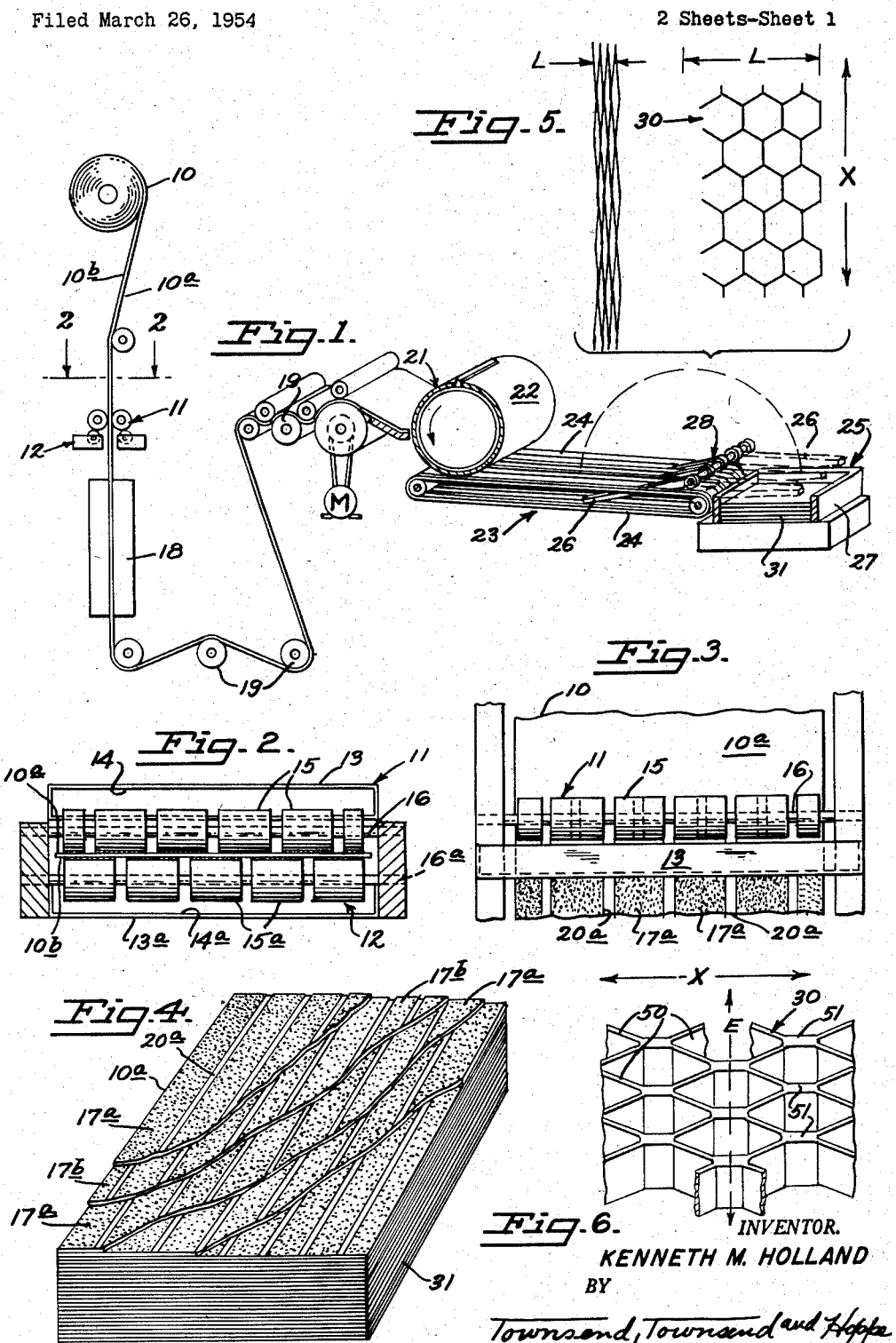
INVENTOR.
KENNETH M. HOLLAND
BY
Townsend, Townsend and Hoppe
ATTORNEYS.

May 19, 1959     K. M. HOLLAND     2,887,425
METHOD OF MAKING RUBBER HONEYCOMB PRODUCT
Filed March 26, 1954     2 Sheets-Sheet 2

INVENTOR.
KENNETH M. HOLLAND
BY
*Townsend, Townsend and Hoppe*
ATTORNEYS

United States Patent Office 2,887,425
Patented May 19, 1959

2,887,425

METHOD OF MAKING RUBBER HONEYCOMB PRODUCT

Kenneth M. Holland, El Cerrito, Calif., assignor to California Reinforced Plastics Company, Oakland, Calif., a corporation of California, now by change of name to Hexcel Products Inc.

Application March 26, 1954, Serial No. 418,934

4 Claims. (Cl. 154—122)

This invention relates to a method of making a vulcanized integral, cohered rubber honeycomb cellular structure.

A product constructed according to the preferred practice of the invention comprises, essentially, a plurality of corrugated or sinusoidally curved webs or ribbons of rubber or rubber faced material which are intimately cohered and vulcanized to one another at their adjacent nodes, thereby defining an integral, open-cell, rubber honeycomb structure. Moreover, the preferred embodiment of the product combines the qualities or property characteristics of being of relatively low density; abrasive resistant; vibration and shock absorbent; heat insulative and water repellant; as well as being extremely tough and durable. Because of these combined qualities, many uses of the product in a wide variety of applications and fields of endeavor suggest themselves, such as for example, in the fields of providing floor mattings and under carpet mattings, instrument mountings, packaging fillers, and upholstery material, to name but a few.

Another unique and important feature of the present invention resides in the fact that an expanded section of the vulcanized rubber honeycomb structure produced according to the invention can, for purpose of convenient and economic storage and shipping, be resiliently yieldably compacted into a unit of anywhere from about one-fifth to about one-thirtieth of its normal expanded length (depending on the thickness of the individual rubber webs and on the nominal cell size of the expanded material), and with only a slightly less corresponding reduction in the overall volume of the material.

The preferred practice of the method to be described hereinafter in more detail comprises the steps of applying spaced, parallel relatively wide lines of a suitable separating agent to opposite sides of a continuous web of either reinforced or unreinforced unvulcanized rubber with the lines or coatings of the separating agent applied to the obverse side of the web arranged in alternately staggered relationship with respect to the parallel lines of separating agent applied to the reverse side of the web; then cutting the continuous web into sheets or sections of equal length; then stacking the cut sections of material one on top of the other with the obverse side lines of separating agent of adjacent sheets disposed contiguous to one another with the reverse lines of separating agent of adjacent sheets disposed contiguous to one another; then compressing the stacked sheets of web material together to cause the uncoated contiguous areas of adjacent sheets to cohere with one another to form a block of unexpanded unvulcanized rubber honeycomb; then expanding said block of unvulcanized rubber honeycomb to form an expanded honeycomb structure; while maintaining the block in expanded condition vulcanizing the rubber; then cutting the vulcanized expanded rubber honeycomb block transversely of the narrow openings into a plurality of individual sheets or sections of honeycomb material.

A principal object, therefore, of the present invention is to teach a unique method of manufacturing a rubber honeycomb structure of the type hereinabove mentioned and to be described hereinafter in more detail.

Other numerous objects and advantages of the present invention will become apparent upon reading the following specification and referring to the accompanying drawings in which similar characters of reference represent corresponding parts in each of the several views.

In the drawings:

Fig. 1 is a schematic view showing partially in side elevation and partially in isometric view a suitable type of apparatus for practicing the method.

Fig. 2 is an enlarged sectional view taken on line 2—2 of Fig. 1.

Fig. 3 is an enlarged front elevational view of one of the separating agent applicating roller assemblies.

Fig. 4 is an enlarged perspective view of a stack of the cut rubber web sections with portions of the upper layers of material shown broken away to expose adjacent lower layers.

Fig. 5 is a schematic view showing how a section of rubber honeycomb can be contracted to about one-sixth of its expanded length.

Fig. 6 is an enlarged fragmentary perspective view of a rubber honeycomb product made according to the invention.

Figure 7:
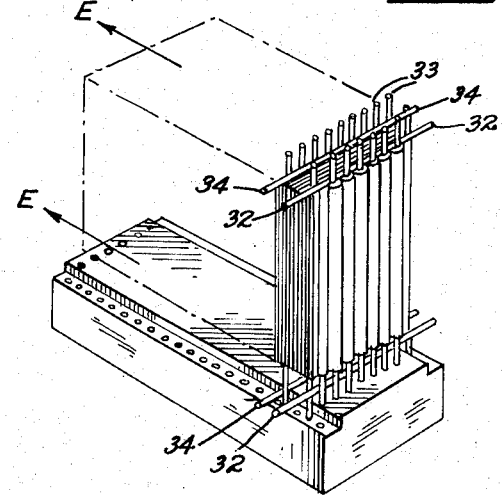
Fig. 7 is a perspective view of a block of unexpanded rubber honeycomb in a suitable expanding jig.

The first step in the preferred method is to provide a continuous web or roll, such as indicated at 10, of reinforced or unreinforced unvulcanized rubber. Whether or not it is desirable to provide a reinforced or supported rubber web depends in large measure upon the use to which the ultimate product is to be put, as well as on the amount of tension and stress to which the rubber web might be subjected during the manufacturing process. In this latter connection, it may be necessary or desirable, for example, to support the web of unvulcanized rubber simply to provide sufficient reinforcing of the material to enable it to withstand the tensioning forces of the particular manufacturing apparatus, if any, employed in practice of the process, and to reduce the possibility of the material unduly deforming, stretching or tearing during the manufacturing process.

The choice of basic natural or synthetic rubber material to be used and the manner of compounding the material to form a suitable continuous web is considered largely a matter of choice depending upon the ultimate use to which the product is to be put. Moreover, the particular manner of compounding the rubber to a desired condition is also considered to involve factors well known within the skill of the art and accordingly is not considered a part of the present invention per se. It will suffice to say that I prefer to compound the rubber material in such manner as to provide an unvulcanized rubber faced web that will not be so tacky as to adhere to metal portions of the apparatus through which the web is forwarded and yet will be sufficiently tacky to itself so that when the material is stacked in the manner to be described, the untreated areas of adjacent stacked rubber faced sheets will, under suitable pressure, flow or migrate into an intimate cohesive bond with one another.

Furthermore, the type of reinforcing material, if any, employed to support the rubber web, as well as the particular manner by which a reinforced web of the desired character may be fabricated, is also considered to be largely a matter of choice and within the skill of the art. By way of example only, it may be desirable to provide a reinforced rubber faced web using a reinforcing material such as cotton duck or sheeting, cheesecloth, glass mat, paper, cotton or nylon thread, yarn, or metallic wire. The rubber can be applied to the reinforcing material either by impregnating the reinforcing material with liquid rubber, or by friction calendering the sheet or rubber material and the reinforcing material together.

The second step involved in the preferred practice of the method is to apply to the obverse and reverse sides $10^a$ and $10^b$ of the web 10 a plurality of spaced, longitudinal, relatively wide lines of a suitable separating agent of a type which will prevent mutual adherence or coherence of sections of the rubber material to one another during the later steps of stacking and compressing the cut rubber web sections together as will be more fully described hereinafter. The choice of separating agent employed in a particular instance is also considered to be largely a matter of choice within the skill of the art. By way of example, however, I have found that a liquid solution of polyvinyl butyral applied to the web and subsequently flash dried by oven heat provides a satisfactory separating agent for the purposes specified. It is also contemplated that numerous other types of separating agents, such as powdered talc or liquid wax, could also be successfully employed.

The lines of separating agent may be applied to the opposite faced surfaces of the web by means of roller applicator assemblies, such as indicated at 11 and 12 in the drawings. More specifically, roller applicator assembly 11 is shown as comprising a reservoir tank 13 for containing a quantity of the liquid agent, a pickup roller 14 rotatably supported in partly immersed position within the tank, and a plurality of applicating rollers indicated at 15 rotatably supported by an axle 16. Applicating rollers 15 are arranged to pick up the liquid agent from pickup roller 14 and apply the agent in continuous parallel lines to the obverse side $10^a$ of the web. Roller applicator assembly 12, provided for applying lines of separating agent to the reverse side $10^b$ of the web, may be considered substantially identical in construction to assembly 11 and accordingly, the component elements comprising assembly 12 are numbered similarly to the corresponding elements comprising assembly 11, but are suffixed by the letter "a" to distinguish them in the drawings. It is observed, however, that rollers $15^a$ of assembly 12 are alternately staggered with respect to rollers 15 of assembly 11 to apply lines $17^b$ of separating agent to reverse side $10^b$ of the web in alternately staggered relation with respect to lines $17^a$ of separating agent applied by assembly 11 to the obverse side $10^a$ of the web. Application of the spaced relatively wide lines $17^a$ and $17^b$ of the separating agent to opposite sides of the web leaves relatively narrower longitudinally extending, spaced, parallel areas or strips $20^a$ and $20^b$ of uncoated unvulcanized rubber which are also alternately staggered with respect to one another.

In the event that a separating agent such as a liquid solution of polyvinyl butyral is employed as above suggested, the volatile solvents in the solution may be driven off so as to leave a dry coating of the separating agent by passing the web material through a suitable gas or electric heated oven as indicated at 18 in the drawings.

The third step involved in the preferred practice of the method consists in cutting the continuous unvulcanized rubber web to which the lines of separating agent has been applied in the manner above described into sections of equal length. In the form of apparatus shown in Fig. 1, this step may be accomplished by advancing the rubber web over a series of suitable drive and idler rollers, such as indicated at 19, to a cutting station indicated generally at 21. Station 21 is shown as comprising a rotary cutter or sheeter 22 of conventional design. The cut sections of rubber web material may then be conveyed by means of an endless conveyor 23, comprising a plurality of spaced parallel belts 24, to a stacking station 25 whereat the next step in the method can be performed.

More specifically, the fourth step consists in stacking the cut sections 31 of material one upon the other with the obverse lines $17^a$ of separating agent of each sheet disposed contiguous with the obverse side lines $17^a$ of the separating agent of an adjacent sheet, and with the reverse side lines of separating $17^b$ of each sheet disposed contiguous with corresponding lines of an adjacent sheet. This arrangement of cut sections within a stack is shown in Fig. 4. By stacking the sections in the above manner, the elongate, uncoated areas or strips of unvulcanized rubber $20^a$ left exposed on the obverse side of each sheet are disposed in contiguous contact with corresponding uncoated areas on the obverse side of an adjacent sheet, and areas $20^b$ on the reverse side of each sheet are similarly in contact with correspondingly uncoated areas appearing on the reverse side of an adjacent sheet. It is these contiguous uncoated areas of adjacent sheets which determine the areas or points between which the adjacent sheets in the stack will cohere to one another to form an integral honeycomb structure as will more fully hereinafter appear.

The stacking of the cut sections of web material in the above matter may be accomplished by any suitable mechanical means or manually. Fig. 1 discloses a suitable apparatus for accomplishing this purpose which comprises a joggle table of conventional construction indicated at 27 in which the cut sections of material are stacked. A sheet turning arm 28 having its turning axis disposed slightly above the plane of the conveyor 23 and adapted to swing back and forth in an arc between the conveyor and joggle table, may be operated in synchronization with the rotary cutter to alternately turn or flip over every other consecutive cut section of web material. The turning arm 28 is shown as comprising a plurality of spaced projecting fingers 26 located relative to the plurality of spaced conveyor belts 24 whereby the free ends of the pickup fingers can swing downwardly below the plane of the top flight of conveyor belts to pick up and turn over every other cut sheet of material as it travels along the conveyor from the cutter. Uniform stacking of the sheets can be enhanced by stacking the sheets within a conventional joggle box as heretofore indicated at 27.

The next step in the preferred practice of the method consists in subjecting the stack to compressive forces sufficient to cause the adjacent uncoated areas $20^a$ and $20^b$ of the unvulcanized rubber to cohere with one another. More specifically, the stack of rubber honeycomb sheets 31 may be removed from the joggle table 27 and placed in a suitable hydraulic or mechanical press capable of applying uniform compressive forces up to 100 p.s.i., for example, or whatever pressure may be required to cause the adjacent uncoated rubber areas $20^a$ and $20^b$ to cohere to one another. It is also appreciated that in certain instances it may be desirable to compound the rubber web material in such manner that adjacent surfaces will not cohere with one another except upon being subjected to both pressure and heat above room temperature. In this event, the stack of material may be placed within a press under suitable pressure and simultaneously subjected to oven heat of required temperature to cause the unvulcanized rubber to assume a tacky or flowable condition adequate to cause cohesive rubber migration between contiguous uncoated areas of adjacent sheets.

The next step involved in the preferred practice of the method involves expansion of the cohered stack or block of honeycomb sections to form an open cellular honeycomb structure 30.

One satisfactory way of expanding the block or stack of such material is by use of a jig of the type illustrated in Fig. 7 in the drawings. A plurality of rods 33 may be inserted through opposite marginal end cells of the unexpanded block, and by means of tug bars 32 and 34, expansion forces in the direction of arrows E may be applied to cause the material to expand to an open cellular honeycomb structure. After the block has been fully expanded, additional filler rods 36 may be inserted along the side marginal cell openings to form in effect a rectilinear frame defined by end marginal rods 33 and side marginal rods 36. The insertion of filler rods through substantially all of the side and end marginal cells of the block enhances uniformity of cell expansion throughout the entire area of the block.

Figure 8:
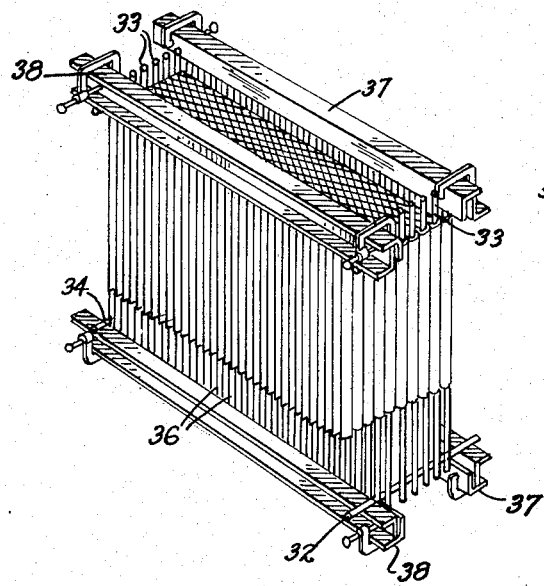
Fig. 8 is a perspective view of an expanded block of the material in a suitable jig useful in maintaining the block uniformly expanded during vulcanization of the rubber material.
Figure 9:
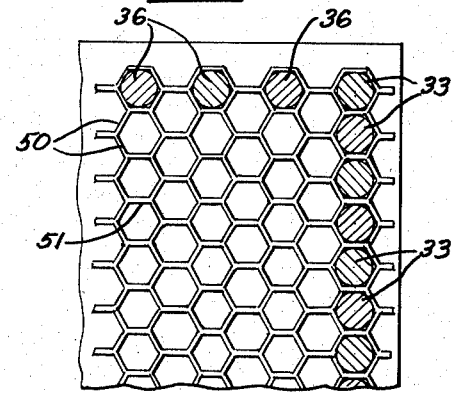
Fig. 9 is an enlarged fragmentary plan view of an expanded block of the material with certain portions of the expanding jig shown in section.

The expanded block of unvulcanized rubber material may be then held in uniformly expanded condition within a suitable jig of the type shown in Fig. 8 which comprises a series of straight edge clamps, as indicated at 37 and 38, for clamping the top and bottom ends of side rods 36 to prevent these lines of rods from bowing inwardly or outwardly during vulcanization of the rubber material. More specifically, with the unvulcanized expanded rubber block of honeycomb suitably secured and jigged as in the manner above suggested, the block may be placed within an appropriately heated oven and for such a period of time as will cause the rubber to vulcanize and cure. Both the temperature and length of curing cycle required to vulcanize the rubber will of course depend to some extent on the nature and formulation of the rubber compound used in a given instance. Such factors are considered well within the skill of the art and do not in themselves comprise a part of the invention.

Once the rubber material is vulcanized, the block will tend to maintain its expanded shape. Accordingly, after the rubber has vulcanized, the block of material may be removed from the jig and thereafter sliced into sheets of desired thickness. In this regard, and to facilitate cutting of the block into smaller sections, the rubber material, being inherently resiliently deformable, can be temporarily compressed and contracted back to its unexpanded shape simply by placing the block under suitable clamping pressure. In this regard, it is convenient to cut the block into slices of desired thickness by using conventional cutting equipment such as, for example, a mechanical guillotine or shear of the type frequently used for cutting stacks of paper.

Conventional equipment of this kind frequently incorporates a screw type holding clamp or vice adjacent the cutting blade for firmly clamping the stack of material to prevent relative movement of layers within the stack during cutting operations. In the practice of the present method, screw clamp equipment of the above mentioned type may be used to maintain the vulcanized rubber honeycomb block under compression and contracted while the shear blade is operated to cut slices of desired thickness from the block.

Fig. 6 discloses an expanded vulcanized rubber honeycomb product manufactured in accordance with the preferred practice of the method hereinabove described. It is observed that the product comprises essentially a plurality of vulcanized rubber ribbons or webs 50, all extending in a generally common direction indicated by reference line "X" in the drawings. The corrugated webs of rubber are intimately cohered to one another at their adjacent nodes, as indicated at 51, to thereby define a unitary integral open cellular rubber honeycomb structure. The orientation of the webs makes the structure particularly adaptable for cushioning or absorbing load bearing or shock impact forces applied to, or acting against, the material in the direction of the cell openings—i.e., in the direction parallel to the reference line indicated "E" in the drawings.

It is appreciated of course that the particular cushioning characteristics of any given piece of rubber honeycomb constructed in accordance with the invention will depend in some measure upon the type of rubber employed as well as the type and kind, if any, of reinforcing material employed in its manufacture.

As heretofore noted, the rubber honeycomb structure, after vulcanization, will tend to remain in its fixed expanded condition as shown in Fig. 6 in the drawings. However, because the rubber material is inherently, resiliently deformable and because of the particular way in which the rubber webs 50 are oriented, it is a relatively simple matter to compress and contract the structure back to its unexpanded condition which, as above explained, may be anywhere from about one-sixth to one-thirtieth of its normal expanded length (indicated by the reference line "L") and with only a slightly less corresponding reduction in overall volume. In short, to facilitate handling and storage and for purposes of economic shipment, a sheet of the rubber honeycomb may be compressed in the direction of its expanded length back to its unexpanded condition as heretofore described by applying sufficient force endwise of the material. Fig. 5 shows schematically how a section 30 of one type of expanded rubber honeycomb can be contracted to approximately one-sixth of its expanded length. Fig. 5 also illustrates the characteristic of the honeycomb material to widen in the direction of its width (reference line "X") as it is shortened in the direction of its length (reference line "L"). The material may be maintained in its compacted form for substantial periods of time during intervals of storage and shipment by any suitable packaging or baling process. Upon unpackaging or unbaling of the compacted structure, it will, because of its inherent elastic recovery, automatically substantially resume its normal fixed expanded length.

Although the present invention has been described with specific reference to natural or synthetic rubber, it is perceived that other types of elastomers having comparable physical characteristics to natural or synthetic rubber might be successfully utilized within the scope of the present invention as defined in the claims appended hereto.

I claim:

1. A method of producing a new rubber product comprising the steps: providing a plurality of flat sections of unvulcanized sheet rubber material; superposing said sections of sheet rubber material one upon the other to form a stack of said sections; intimately cohering the unvulcanized rubber material of adjacent sheets in the stack together along elongate spaced parallel areas extending in a common direction and with the first side of each sheet intimately cohered to an adjacent sheet along said spaced parallel areas disposed in staggered relation to the spaced parallel areas of intimate cohesion between the second side of said sheet and an adjacent sheet; expanding the stack of cohered sheets of rubber material outwardly in a direction perpendicular to the flat surfaces of said sections to form an open cellular honeycomb structure; and while maintaining said structure in its expanded condition, vulcanizing the rubber material to cause said section to maintain a resiliently deformable expanded open-cell condition.

2. The method of claim 1 and including the further step of forcefully resiliently yieldably compressing the expanded vulcanized rubber honeycomb section back to its unexpanded condition; and while maintaining said section in unexpanded condition, slicing said section in a direction perpendicular to the direction of cell openings to form a plurality of smaller sections of the vulcanized rubber honeycomb material.

3. A method of producing a new rubber product comprising the steps: providing a continuous elongate web of unvulcanized rubber material; applying spaced parallel lines of separating agent longitudinally of the web to the obverse and reverse sides of said web with the lines of separating agent applied to the obverse side disposed in alternately staggered relationship with respect to the lines of separating agent applied to the reverse side of the web; cutting the continuously advancing web transversely of the line of separating agent into sheets of equal dimension; then stacking the cut sheets of material one on top of the other with the obverse side lines of separating agent of adjacent sheets disposed contiguously to one another and with the reverse lines of separating agent of adjacent sheets disposed contiguous to one another and in alternate staggered relationship with respect to the obverse lines of separating agent; then compressing the stacked sheets of unvulcanized rubber material together to cause the uncoated contiguous areas of adjacent sheets defined by the spaces between the lines of separating agent to intimately cohere together and to thereby form an integral section of unexpanded unvulcanized expandable rubber honeycomb; then expanding said section of unvulcanized rubber honeycomb to form an expanded honeycomb cellular structure; and while maintaining said section in expanded condition vulcanizing said rubber material to maintain a resiliently deformable expanded condition.

4. The method of claim 3 which includes the additional step of forcibly compressing the vulcanized expanded rubber honeycomb section back to its unexpanded condition and while maintaining said section in its yieldably resiliently contracted condition, cutting the section transversely in the direction in which the cell openings extend into a plurality of individual sections of the vulcanized rubber honeycomb structure.

References Cited in the file of this patent

UNITED STATES PATENTS

| | | |
|---|---|---|
| 2,189,813 | McGuire | Feb. 13, 1940 |
| 2,369,006 | Banks | Feb. 6, 1945 |
| 2,539,058 | Burns | Jan. 23, 1951 |
| 2,608,502 | Merriman | Aug. 26, 1952 |